(12) United States Patent
Takeshita et al.

(10) Patent No.: US 9,791,660 B2
(45) Date of Patent: Oct. 17, 2017

(54) LENS BARREL, CAMERA BODY, AND IMAGING DEVICE

(71) Applicant: FUJIFILM Corporation, Tokyo (JP)

(72) Inventors: Yukitaka Takeshita, Saitama (JP); Mitsuhiko Oka, Saitama (JP); Yuichi Kawanabe, Saitama (JP); Yi Pan, Saitama (JP); Shinji Otsuka, Saitama (JP); Kazuyoshi Azegami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/469,580

(22) Filed: Mar. 27, 2017

(65) Prior Publication Data

US 2017/0199347 A1    Jul. 13, 2017

Related U.S. Application Data

(63) Continuation of application No. PCT/JP2015/077344, filed on Sep. 28, 2015.

(30) Foreign Application Priority Data

Sep. 29, 2014  (JP) ................. 2014-199346

(51) Int. Cl.
  *G02B 7/02*    (2006.01)
  *G02B 7/04*    (2006.01)
  *H04N 5/225*   (2006.01)
  *H04N 5/232*   (2006.01)

(52) U.S. Cl.
  CPC ............. *G02B 7/04* (2013.01); *H04N 5/2254* (2013.01); *H04N 5/23293* (2013.01)

(58) Field of Classification Search
  CPC ....................................................... G02B 7/04

USPC .......................................................... 359/825
See application file for complete search history.

(56) References Cited

U.S. PATENT DOCUMENTS

| 7,792,422 B2 | 9/2010 | Mori |
| 7,969,672 B2 | 6/2011 | Harada et al. |
| 9,013,607 B2 | 4/2015 | Taguchi et al. |
| 9,235,026 B2 | 1/2016 | Taguchi et al. |

(Continued)

FOREIGN PATENT DOCUMENTS

| JP | 05-002204 | 1/1993 |
| JP | 2007-178633 | 7/2007 |
| JP | 2007-228605 | 9/2007 |

(Continued)

*Primary Examiner* — James Jones
(74) *Attorney, Agent, or Firm* — Jianq Chyun IP Office (57) ABSTRACT

An object of the invention is to provide a camera body of which a manual focus mode can be easily switched.

A lens barrel includes an imaging optical system, a first operation ring, a second operation ring, and first and second sensors. The first sensor detects the rotation of the first operation ring and the rotation angle and the rotational direction of the first operation ring. The second sensor detects the angular position of the second operation ring. The imaging optical system includes a focus lens. A camera body includes a body control unit. The body control unit selectively executes a first manual focus mode in which the focus lens is moved according to the rotational direction and the rotation angle detected by the first sensor and a second manual focus mode in which the focus lens is moved according to the angular position detected by the second sensor.

7 Claims, 10 Drawing Sheets

(56) References Cited

U.S. PATENT DOCUMENTS

2007/0147818 A1* 6/2007 Mori ..................... G02B 7/102
396/144
2016/0088223 A1* 3/2016 Okazaki ............ H04N 5/23209
348/372

FOREIGN PATENT DOCUMENTS

| JP | 2010-049202 | 3/2010 |
| JP | 5028945 | 9/2012 |
| JP | 2013-007837 | 1/2013 |

* cited by examiner

LENS BARREL, CAMERA BODY, AND IMAGING DEVICE

CROSS-REFERENCE TO RELATED APPLICATION

This application is a Continuation of PCT International Application PCT/JP2015/077344 filed on 28 Sep. 2015, which claims priority under 35 USC 119(a) from Japanese Patent Application No. 2014-199346 filed on 29 Sep. 2014. The above application is hereby expressly incorporated by reference, in its entirety, into the present application.

BACKGROUND OF THE INVENTION

1. Field of the Invention

The present invention relates to a lens barrel, a camera body, and an imaging device that have a manual focus function.

2. Description of the Related Art

A single lens reflex camera for an expert or the like has a manual focus function that allows a user to manually adjust a focus. A camera having a manual focus function includes an operation ring that is operated by a user and a drive unit that moves a focus lens according to the rotation angle or the angular position of the operation ring.

JP5028945B (corresponding to U.S. Pat. No. 7,969,672) and JP2013-7837A (corresponding to U.S. Pat. Nos. 9,013,607 and 9,235,026) disclose cameras that have a first manual focus mode and a second manual focus mode. In the first manual focus mode, a focus lens is moved according to the rotation angle of an operation ring. In the second manual focus mode, the focus lens is moved according to the angular position of the operation ring. Each of the cameras disclosed in JP5028945B and JP2013-7837A can adjust a focus by appropriately switching the first manual focus mode and the second manual focus mode.

Specifically, each of the cameras disclosed in JP5028945B and JP2013-7837A includes an operation ring that is mounted so as to be movable between a first position and a second position in the direction of an optical axis of an imaging optical system. The operation ring can endlessly rotate in a case in which the operation ring is positioned at the first position. The operation ring can rotate about the optical axis in a limited angular range in a case in which the operation ring is positioned at the second position.

Further, each of the cameras disclosed in JP5028945B and JP2013-7837A includes a first detection unit, a second detection unit, a drive unit, and a control unit. The first detection unit detects the rotation angle of the operation ring. The second detection unit detects the angular position of the operation ring. The drive unit moves the focus lens. The control unit controls the first detection unit, the second detection unit, and the drive unit. Specifically, the control unit moves the focus lens according to the rotation angle of the operation ring in a case in which the operation ring is positioned at the first position. The control unit moves the focus lens according to the angular position of the operation ring in a case in which the operation ring is positioned at the second position. In the camera disclosed in JP2013-7837A, the operation ring is provided with a distance scale and a lens barrel body is provided with an index. In the event that the angular position of the operation ring positioned at the second position is changed, the control unit moves the focus lens to a position where an imaging distance corresponding to the distance scale of a position indicated by the index is obtained.

In a case in which a user determines an imaging distance through eye measurement or the like and takes an image, it is easy to use the second manual focus mode in which the focus lens is moved according to the angular position of the operation ring. Ina case in which a user finely adjusts an imaging distance little by little while checking an image, it is easy to use the first manual focus mode in which the focus lens is moved according to the rotation angle of the operation ring.

However, in the cameras disclosed in JP5028945B and JP2013-7837A, a mode is switched between the first manual focus mode and the second manual focus mode by the sliding of the operation ring in the direction of the optical axis. For this reason, labor is required for a switching operation. There is a possibility that an imaging timing may be missed while the switching operation is performed.

SUMMARY OF THE INVENTION

An object of the invention is to provide a lens barrel, a camera body, and an imaging device of which a manual focus mode can be easily switched.

A lens barrel of the invention comprises a lens barrel body, a first operation ring, a second operation ring, a first sensor, a second sensor, and a drive unit. The lens barrel body houses an imaging optical system including a focus lens. The first operation ring is mounted on the lens barrel body so as to be endlessly rotatable about an optical axis of the imaging optical system. The second operation ring is mounted on the lens barrel body so as to be rotatable about the optical axis in a limited angular range. The first sensor detects a rotation of the first operation ring and a rotational direction and a rotation angle of the first operation ring. The second sensor detects an angular position of the second operation ring. The drive unit moves the focus lens in a direction of the optical axis on the basis of an output of the first sensor or an output of the second sensor.

It is preferable that the first sensor includes a comb-tooth ring and an optical sensor. The comb-tooth ring is provided on an inner peripheral surface of the first operation ring. The optical sensor detects teeth of the comb-tooth ring. Further, it is preferable that the second sensor includes a cam member and a variable resistor. The cam member converts a rotational motion into a linear movement while being linked with the second operation ring. The resistance value of the variable resistor is changed by the linear movement of the cam member.

One of the lens barrel body and the second operation ring is provided with a distance scale and the other thereof is provided with an index. It is preferable that the drive unit moves the focus lens to a position, which corresponds to the distance scale set to a position of the index, on the basis of an output of the second sensor.

The lens barrel is detachably connected to a camera body of the invention. The camera body comprises a control unit and an imaging unit. The control unit controls the drive unit of the lens barrel and selectively executes a first manual focus mode and a second manual focus mode. In the first manual focus mode, the control unit moves the focus lens according to the rotational direction and the rotation angle detected by the first sensor. In the second manual focus mode, the control unit moves the focus lens according to the angular position detected by the second sensor. The imaging unit takes an image with light emitted from the lens barrel body.

It is preferable that in the case of the first manual focus mode, the control unit obtains a rotational speed on the basis of the rotation angle, which is detected per predetermined time by the first sensor, and changes a moving distance of the focus lens according to the rotational speed.

It is preferable that the control unit inhibits the execution of the second manual focus mode while the first sensor detects the rotation. It is preferable that the control unit inhibits the execution of the first manual focus mode while the angular position detected by the second sensor is changed.

It is preferable that the camera body further comprises a notification unit that notifies the generation of a difference equal to or larger than a certain level between the position of the focus lens and a position corresponding to the distance scale in a case in which the difference equal to or larger than a certain level is generated between the position of the focus lens and the position corresponding to the distance scale in the first manual focus mode. It is preferable that the notification unit is an image display unit displaying an image and displays that the difference is generated.

It is preferable that a mark representing an auto-focus position is provided on one, which is provided with the distance scale, of the lens barrel body and the second operation ring outside the distance scale in a circumferential direction. It is preferable that the lens barrel body comprises a lock mechanism. The lock mechanism locks the second operation ring in a case in which the position of the index is set to the mark.

It is preferable that the control unit obtains a focus position on the basis of an imaging signal obtained by the imaging unit in a case in which the index is set to the mark, and moves the focus lens to the focus position.

An imaging device of the invention comprises a lens barrel body, a first operation ring, a second operation ring, a first sensor, a second sensor, a drive unit, a control unit, and an imaging unit.

According to the invention, since the imaging device comprises the first operation ring that is mounted on the lens barrel body so as to be endlessly rotatable about an optical axis of the imaging optical system and the second operation ring that is mounted on the lens barrel body so as to be rotatable about the optical axis in a limited angular range, a manual focus mode can be easily switched.

DESCRIPTION OF THE PREFERRED EMBODIMENTS

Figure 1:
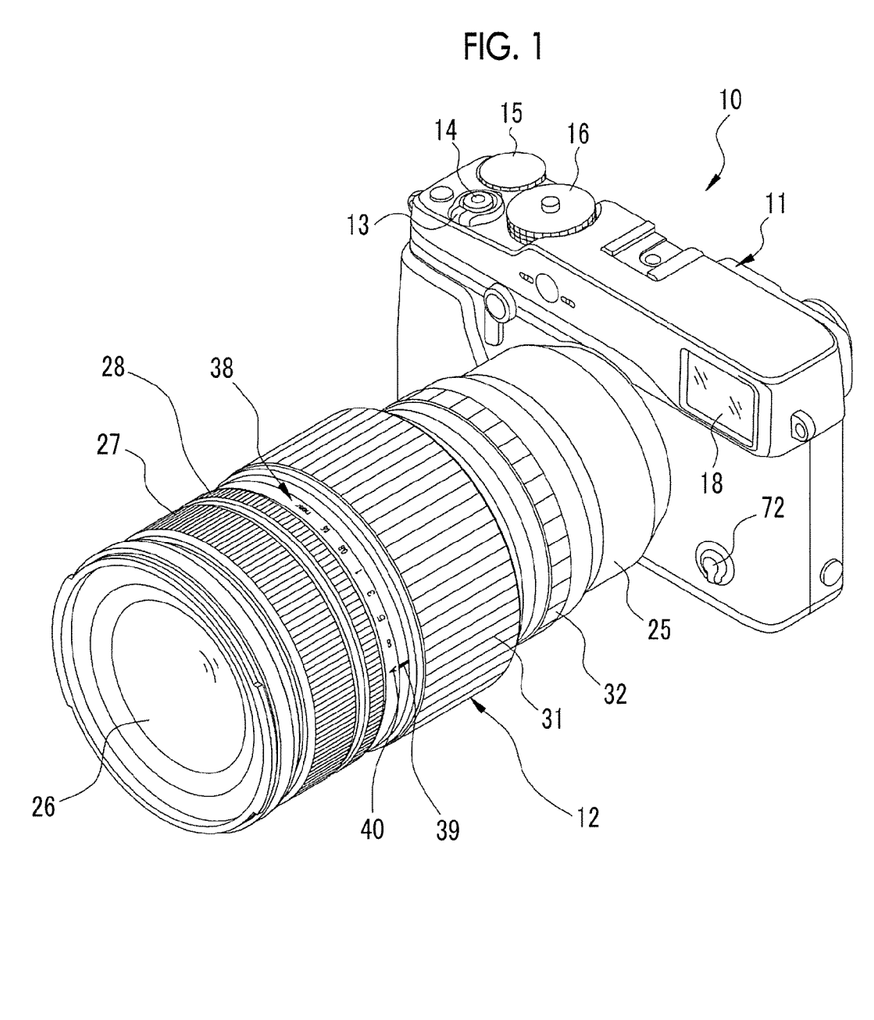
FIG. 1 is a perspective view of the front appearance of a lens-interchangeable digital camera.
Figure 2:
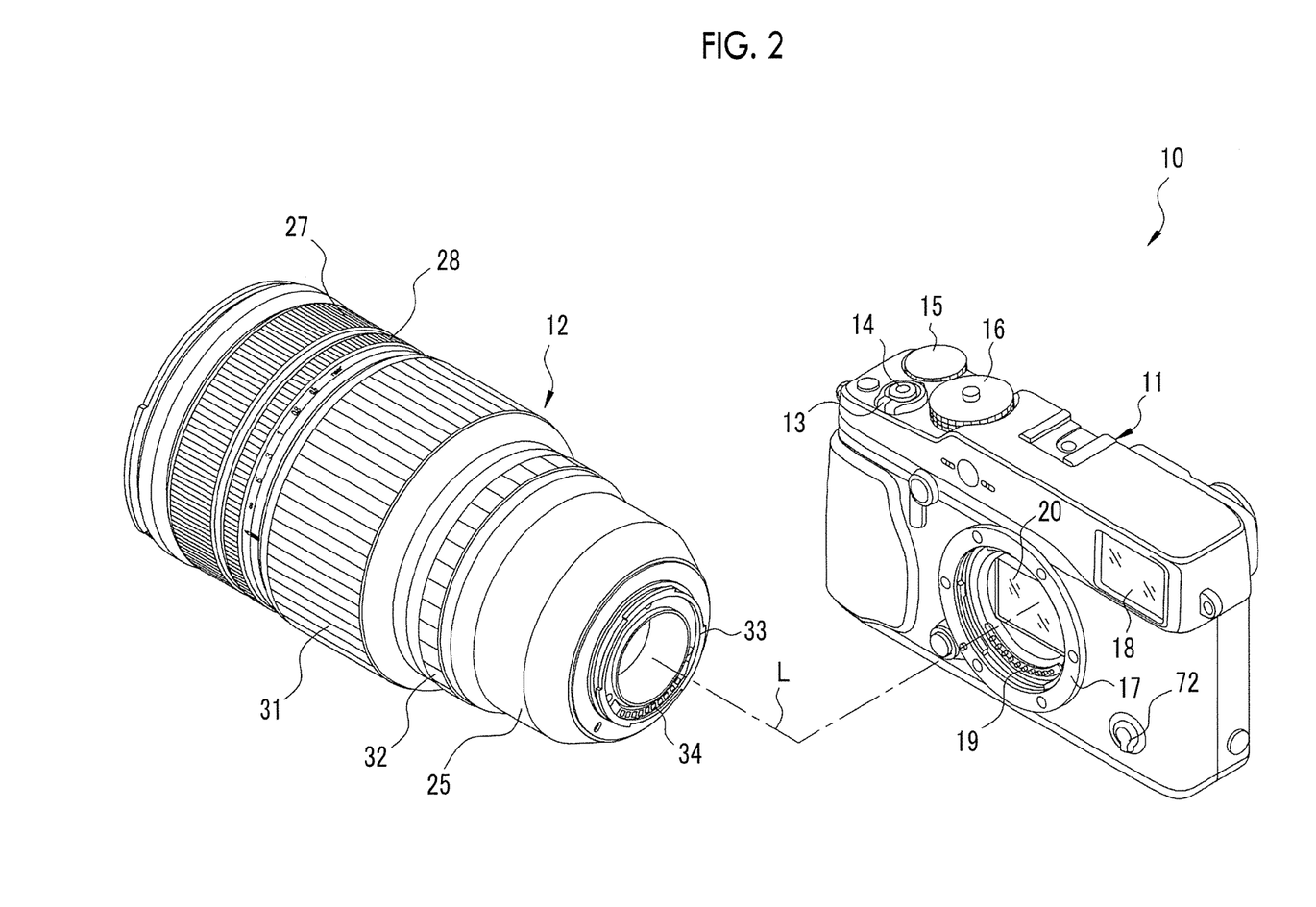
FIG. 2 is a perspective view of the appearance of a lens barrel and a camera body.

In FIGS. 1 and 2, a lens-interchangeable digital camera (hereinafter, referred to as a camera) 10 includes a camera body 11 and a lens barrel 12. The lens barrel 12 is detachably connected to the camera body 11. The camera 10 is a so-called mirrorless single-lens digital camera.

The camera body 11 includes a power lever 13, a release switch 14, an exposure correction dial 15, and a shutter speed dial 16 on the upper surface thereof. The release switch 14 is a so-called two-stage stroke type switch that allows "half press" and "full press". The release switch 14 outputs an S1-ON signal upon being half pressed. The release switch 14 outputs an S2-ON signal in the event that full press in which the release switch is further pressed from the half press is performed. In the event that an S1-ON signal is output from the release switch 14, the camera 10 performs imaging preparation processing, such as automatic focusing (AF (Auto Focus) processing) or automatic exposure control. In the event that an S2-ON signal is output from the release switch 14, the camera 10 performs image processing.

A mount 17 on which the lens barrel 12 is to be mounted and an optical finder window 18 are provided on the front surface of the camera body 11. A body-side signal contact 19, which is to be electrically connected to the lens barrel 12, and a solid-state imaging element 20 are provided in the mount 17.

Figure 3:
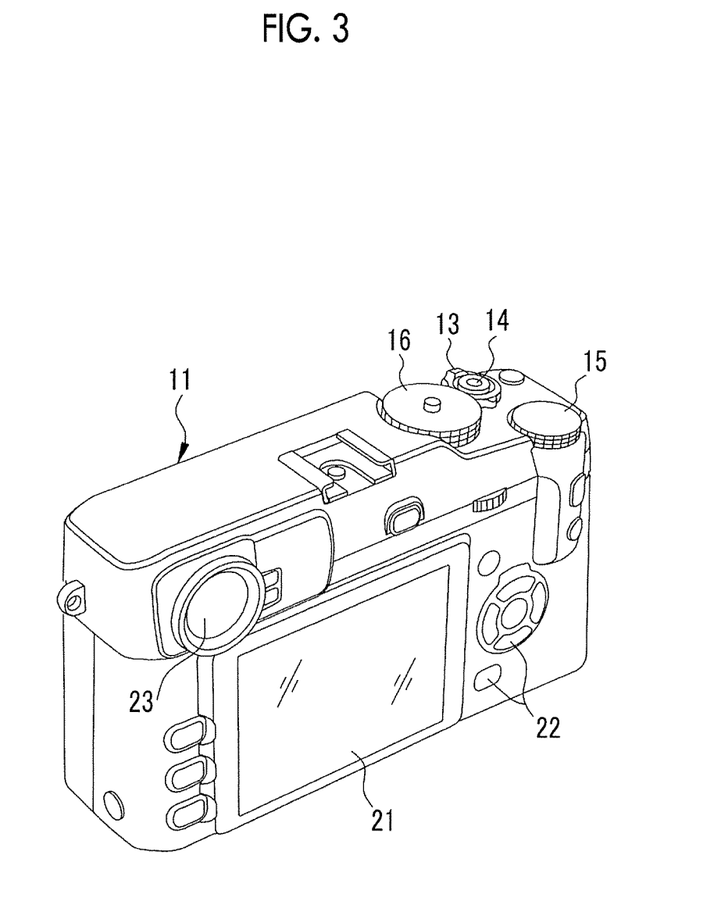
FIG. 3 is a perspective view of the back appearance of the camera body.

As shown in FIG. 3, an image display unit 21, operation buttons 22, and a finder eyepiece 23 are provided on the back surface of the camera body 11. The image display unit 21 displays a live view image or a taken image. The image display unit 21 is formed of, for example, a liquid crystal display (LCD) panel. A plurality of operation buttons 22 are provided, and are used for various setting operations, and the like. The finder eyepiece 23 can be switched to an optical finder and an electronic finder. The optical finder allows an optical image, which is obtained through the optical finder window 18, to be observed. The electronic finder allows a live view image, which is taken by the solid-state imaging element 20, to be observed. Ina case in which the finder eyepiece 23 is switched to the electronic finder, a live view image, which is taken by the solid-state imaging element 20, is displayed on an electronic view finder (EVF) panel 24 (see FIG. 8) that is disposed behind the finder eyepiece 23 and is formed of a LCD or the like.

The lens barrel 12 includes a lens barrel body 25, an imaging optical system 26, a first operation ring 27, a second operation ring 28, first and second sensors 29 and 30 (see FIGS. 4 to 7), a zoom ring 31, a diaphragm adjusting ring 32, a lens mount 33, and a lens-side signal contact 34. The lens barrel body 25 has a cylindrical shape, and houses the imaging optical system 26 therein. The lens mount 33 is provided at the rear end of the lens barrel body 25. In a case in which the lens barrel 12 is connected to the camera body 11, the imaging optical system 26 forms an image on the solid-state imaging element 20 with subject light. The solid-state imaging element 20 is an imaging unit that takes an image with light passing through the lens barrel 12.

The lens mount 33 is detachably coupled to the mount 17 of the camera body 11. In a case in which the lens mount 33 of the lens barrel 12 is coupled to the mount of the camera body 11, the lens-side signal contact 34 comes into contact with the body-side signal contact 19 and electrically connects the lens barrel 12 to the camera body 11.

The first and second operation rings 27 and 28 are operation members that are used in a case in which a user manually rotates the operation members to adjust a focus. The first operation ring 27 is mounted on the lens barrel body 25 so as to be endlessly rotatable about an optical axis L of the imaging optical system 26. An endlessly rotatable structure, which is mentioned here, is a structure in which the first operation ring can be unlimitedly rotated without a fixed end in any rotational direction in a case in which the first operation ring is rotated relative to the lens barrel body 25.

Figure 4:
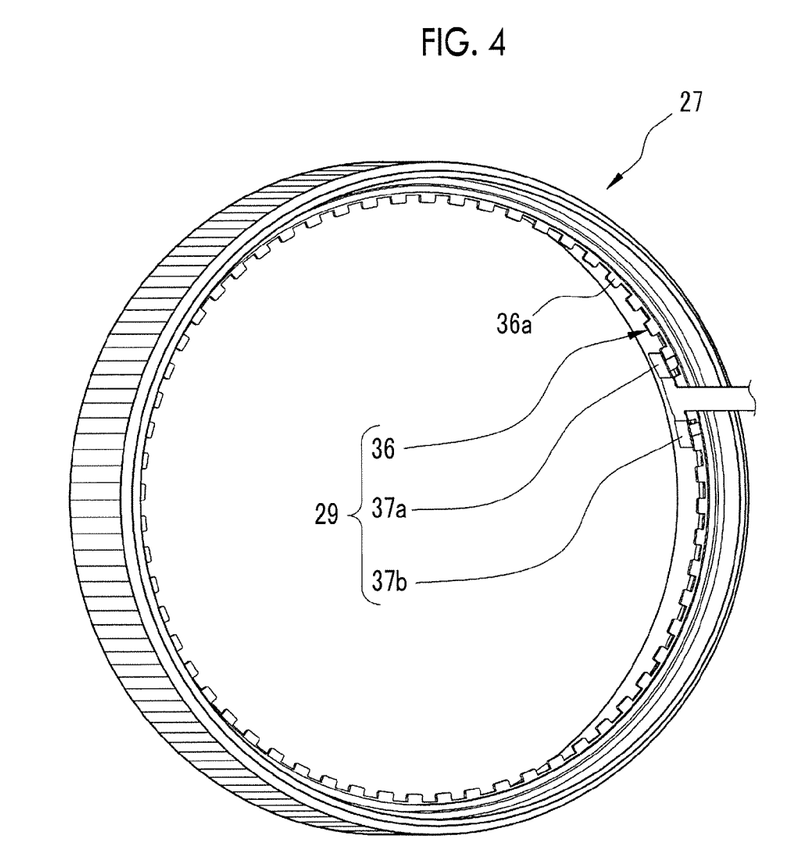
FIG. 4 is a perspective view of a first operation ring and a first sensor.

As shown in FIG. 4, the first sensor 29 includes a comb-tooth ring 36 and photo-interrupters 37a and 37b. The comb-tooth ring 36 is provided on the inner peripheral surface of the first operation ring 27. The comb-tooth ring 36 rotates integrally with the first operation ring 27. Teeth 36a having the same shape are provided on the comb-tooth ring 36 with a constant pitch P in the circumferential direction of the first operation ring 27. The teeth 36a cause detection signals of the photo-interrupters 37a and 37b to change by blocking light that is incident on light-receiving elements of the photo-interrupters 37a and 37b.

The photo-interrupter 37a is an optical sensor that is provided at a position where a light emitting diode and a light-receiving element face each other. The detection signal of a light-receiving element of the photo-interrupter 37a is output to a body control unit 60 (see FIG. 8), which is provided in the camera body 11, through the lens-side signal contact 34 and the body-side signal contact 19. Further, the structure of the photo-interrupter 37b is the same as the structure of the photo-interrupter 37a. The detection signal of a light-receiving element of the photo-interrupter 37b is output to the body control unit 60 through the lens-side signal contact 34 and the body-side signal contact 19.

Since the teeth 36a block light that is incident on the light-receiving elements of the photo-interrupters 37a and 37b in a case in which the first operation ring 27 rotates, the detection signals of the photo-interrupters 37a and 37b are changed. Accordingly, the body control unit 60 can detect the rotation of the first operation ring 27. In addition, the body control unit 60 can detect the rotation angle of the first operation ring 27 by counting the number of times in which the teeth 36a block the light to be incident on the light-receiving elements of the photo-interrupters 37a and 37b in a case in which the first operation ring 27 rotates.

Figure 5:
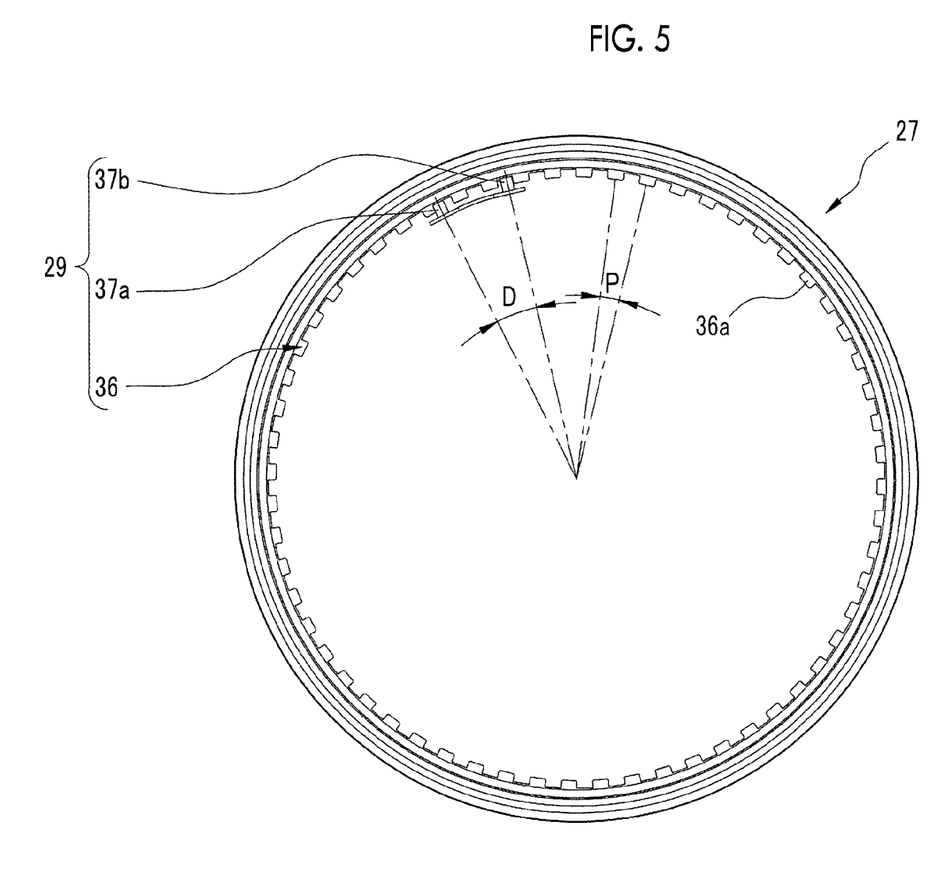
FIG. 5 is a front view of the first operation ring and the first sensor.

As shown in FIG. 5, the photo-interrupters 37a and 37b are disposed so as to have phases, which are different from each other, with respect to the pitch P of the teeth 36a of the comb-tooth ring 36. Specifically, the photo-interrupters 37a and 37b are disposed at positions where an interval D between the photo-interrupters 37a and 37b in the circumferential direction satisfies (¼+N)×P (here, N is a positive integer). In this embodiment, N is set to 2.

Accordingly, in the event that a time corresponding to a distance of "¼×P" has passed after the teeth 36a block the light that is incident on the light-receiving element of the photo-interrupter 37a in a case in which the first operation ring 27 rotates to one side, any of the teeth 36a blocks the light that is incident on the light-receiving element of the photo-interrupter 37b.

Further, in the event that a time corresponding to a distance of "¼×P" has passed after the teeth 36a block the light that is incident on the light-receiving element of the photo-interrupter 37b in a case in which the first operation ring 27 rotates to the other side, any of the teeth 36a blocks the light that is incident on the light-receiving element of the photo-interrupter 37a. Accordingly, the rotational direction of the first operation ring 27 can be detected.

Figure 6:
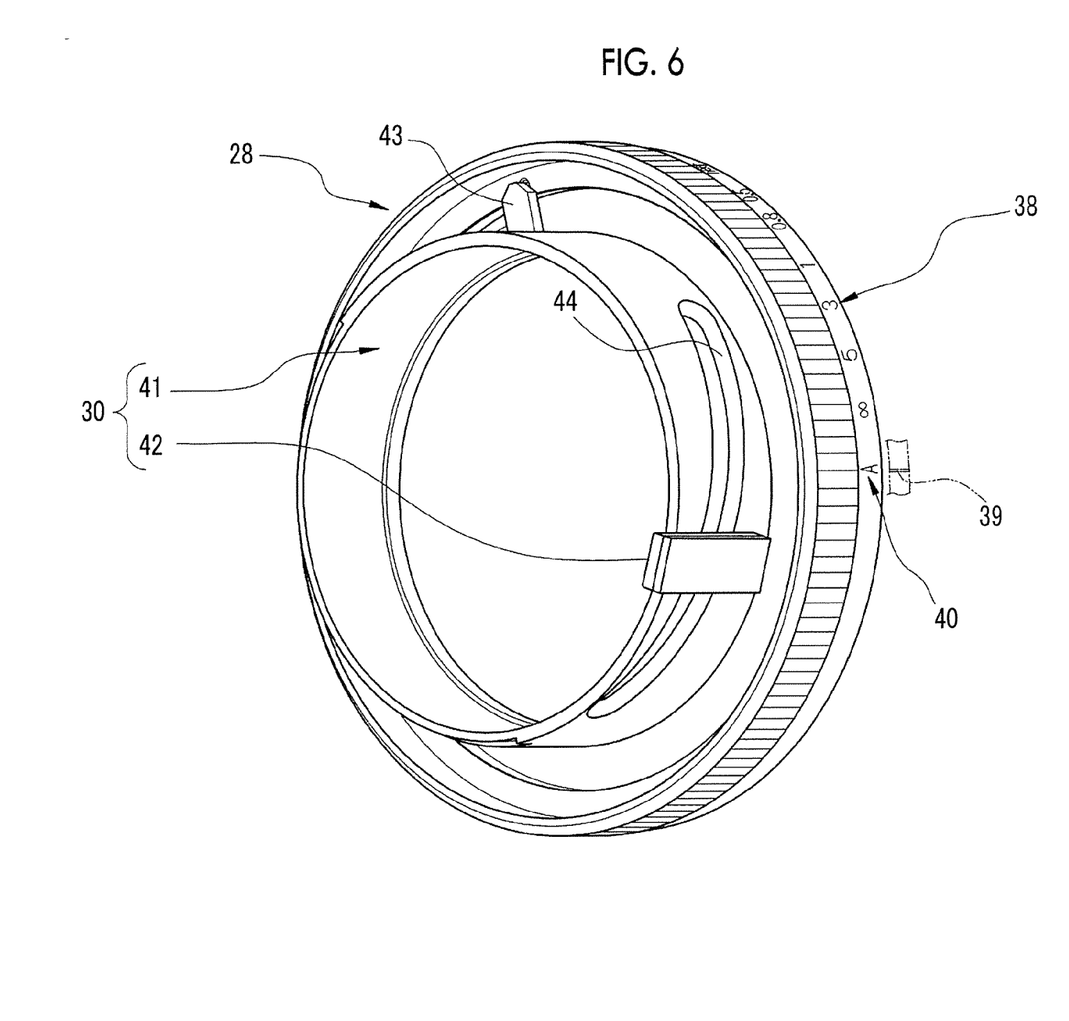
FIG. 6 is a perspective view of a second operation ring and a second sensor.

As shown in FIG. 6, the second operation ring 28 is provided with a distance scale 38. Symbols and numerals, such as "near, 0.5, 0.8, 1, 3, 5, and ∞", are arranged on the distance scale 38 in the circumferential direction of the second operation ring 28. "near" represents the shortest distance that allows an image to be taken, "∞" represents infinity, and the other numerals represent an imaging distance of which the unit is meter. An imaging distance is a distance between the camera 10 and a subject on which the camera 10 focuses, and is linked with a focal distance. The lens barrel body 25 is provided with an index 39. The index 39 is a linear mark.

Further, a mark 40 of "A" is provided on the second operation ring 28 outside the distance scale 38 in the circumferential direction. The mark 40 represents an auto-focus position. In this embodiment, the mark 40 of "A" is provided outside the symbol of "∞".

The second sensor 30 includes a cam barrel 41 and a position sensor 42. Since the cam barrel 41 is connected to the second operation ring 28 by a connection part 43, the cam barrel 41 rotates integrally with the second operation ring 28. The cam barrel 41 is formed in a cylindrical shape. The cam barrel 41 includes a cam groove 44. The cam groove 44 is cut along a direction inclined with respect to the circumferential direction around the optical axis L.

Figure 7:
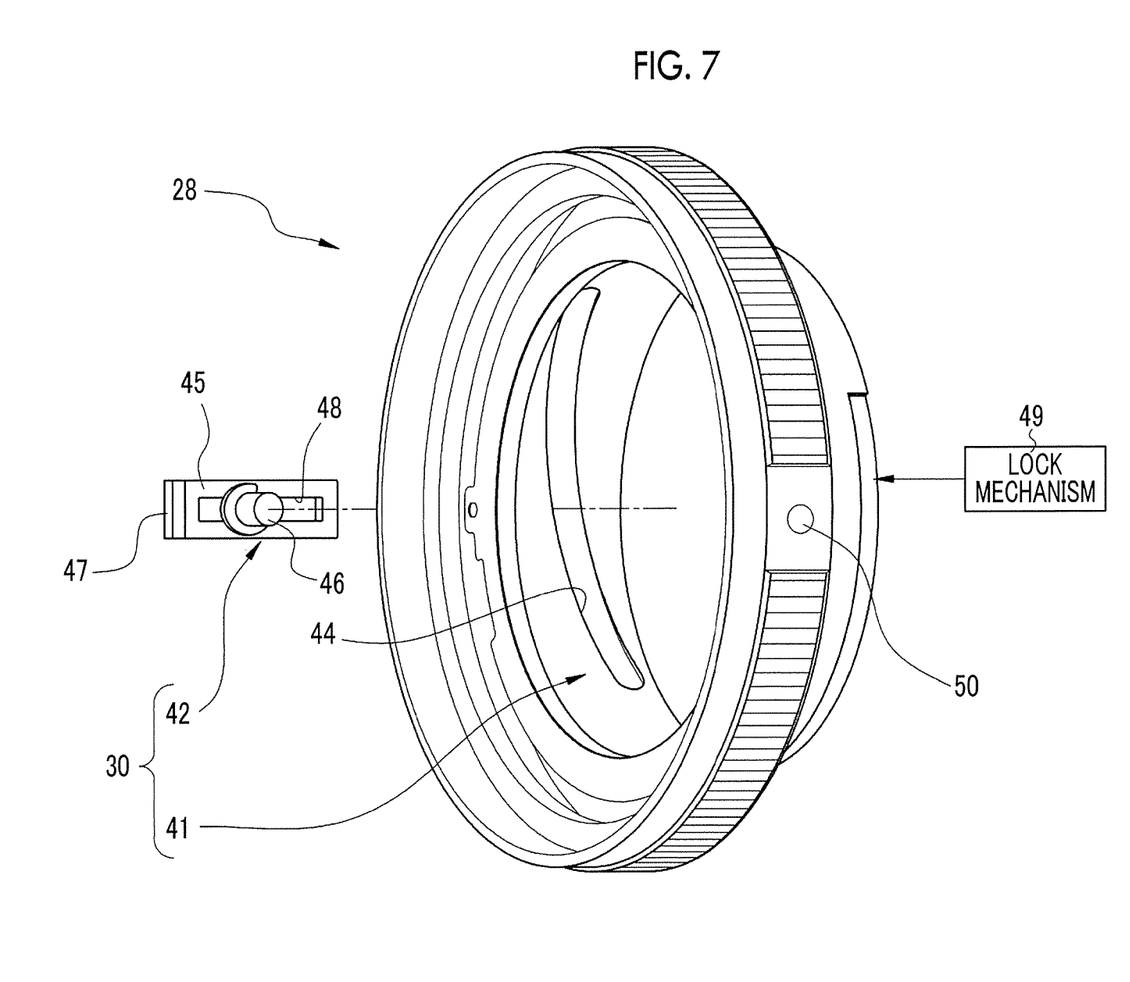
FIG. 7 is a perspective view of the second operation ring and the second sensor that are seen from the back side.

As shown in FIG. 7, the position sensor 42 includes a fixed frame 45, a cam pin 46, and a resistor substrate 47. The fixed frame 45 supports the cam pin 46 and the resistor substrate 47, and is fixed to the lens barrel body 25. A guide groove 48, which is parallel to the optical axis L, is formed in the fixed frame 45, and the resistor substrate 47 is fixed at a position facing the guide groove 48. The cam pin 46 is engaged with the cam groove 44 and is inserted into the guide groove 48.

The cam barrel 41 forms a cam member, which converts a rotational motion into a linear movement while being linked with the second operation ring 28, together with the cam pin 46 and the guide groove 48. In the event that the cam barrel 41 rotates while being linked with the second operation ring 28, the cam pin 46 is linearly moved in parallel to the optical axis L as being guided by the guide groove 48. The second operation ring 28 can rotate in a range in which the cam pin 46 is moved in the cam groove 44. That is, the second operation ring 28 is mounted on the lens barrel body 25 so as to be rotatable about the optical axis L in a limited angular range.

The resistor substrate 47 comes into contact with the cam pin 46 and forms a variable resistor of which the resistance value is changed by the linear movement of the cam pin 46. The resistor substrate 47 output a resistance value to the body control unit 60 as a detection signal. Since the resistance value is changed according to the angular position of the second operation ring 28, the body control unit 60 can detect the angular position of the second operation ring 28 on the basis of the resistance value.

Further, the lens barrel body 25 is provided with a lock mechanism 49. In a case in which the position of the index 39 is set to the mark 40 representing an auto-focus position, the lock mechanism 49 restricts the rotation of the second operation ring 28 by locking the second operation ring 28. The second operation ring 28 is provided with a lock release button 50. In the event that the lock release button 50 is pressed, the lock mechanism 49 allows the rotation of the second operation ring 28 by releasing the lock of the second operation ring 28.

Figure 8:
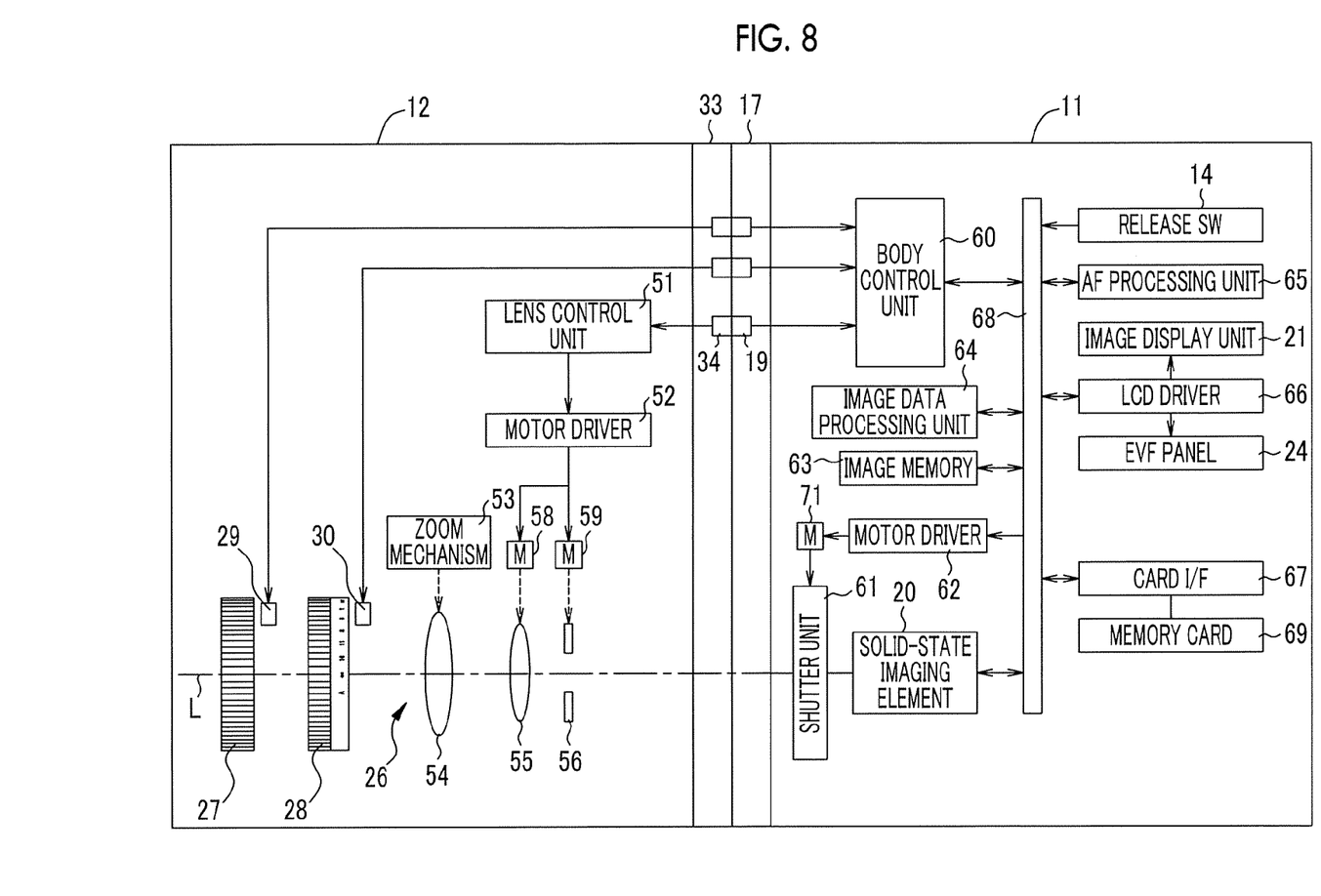
FIG. 8 is a block diagram showing the configuration of the lens-interchangeable digital camera.

As shown in FIG. 8, the lens barrel 12 includes a lens control unit 51, a motor driver 52, and a zoom mechanism 53 in addition to the imaging optical system 26, the first operation ring 27, the second operation ring 28, the first and second sensors 29 and 30 that have been described above, and the like.

The lens control unit 51 is formed of a microcomputer that includes a CPU (Central Processing Unit), a ROM (Read Only Memory) storing programs and parameters used in the CPU, and a RAM (Random Access Memory) used as a work memory of the CPU (all of them are not shown); and controls the respective parts of the lens barrel 12. The motor driver 52 is connected to the lens control unit 51.

The imaging optical system 26 includes a plurality of lenses, which include a variable magnification lens 54 and a focus lens 55, and a diaphragm unit 56. The zoom mechanism 53 is a manual zoom mechanism, and moves the variable magnification lens 54 by converting the rotational motion of the zoom ring 31 to a linear movement. The variable magnification lens 54 is moved in the direction of the optical axis L by the driving of the zoom mechanism 53, and changes the angle of view.

The focus lens 55 is moved in the direction of the optical axis L by the driving of a motor 58, and adjusts an imaging distance. The diaphragm unit 56 moves a plurality of diaphragm blades (not shown) by the driving of a motor 59 and changes the amount of an incident ray to be incident on the solid-state imaging element 20. The motors 58 and 59 are stepping motors or servo motors. The motor driver 52 controls the driving of the motors 58 and 59 on the basis of the control of the lens control unit 51. In this embodiment, the motor 58 and the motor driver 52 forms a lens drive unit that moves the focus lens 55 in the direction of the optical axis L.

The lens-side signal contact 34 sends and receives an electrical signal between the lens barrel 12 and the camera body 11. Specifically, the lens-side signal contact 34 sends a signal to the lens control unit 51 from the camera body 11. The lens-side signal contact 34 sends detection signals, which are output from the first and second sensors 29 and 30, to the camera body 11 from the lens barrel 12. The lens-side signal contact 34 receives power supplied from the camera body 11 and supplies power to the respective parts of the lens barrel 12.

Further, the lens barrel 12 is provided with a sensor (not shown) that detects the angular position or the rotational direction and the rotation angle of the diaphragm adjusting ring 32, and this sensor sends a detection signal to the camera body 11 as in the cases of the first and second sensors 29 and 30.

The camera body 11 includes the body control unit 60, a shutter unit 61, a motor driver 62, an image memory 63, an image data processing unit 64, an AF processing unit 65, a LCD driver 66, and a card I/F (Inter Face) 67 in addition to the release switch 14, the solid-state imaging element 20, the image display unit 21, and the EVF panel 24 that have been described above. The respective parts of the camera body 11 are connected to each other through a busline 68.

The body control unit 60 includes a CPU, a ROM that stores programs and parameters used in the CPU, and a RAM that is used as a work memory of the CPU (all of them are not shown). The body control unit 60 controls the camera body 11 and the respective parts of the lens barrel 12 that is connected to the camera body 11. The S1-ON signal and the S2-ON signal are input to the body control unit 60 from the release switch 14. Further, the body-side signal contact 19 is connected to the body control unit 60.

The shutter unit 61 is a so-called focal-plane shutter. The shutter unit 61 is disposed between the mount 17 and the solid-state imaging element 20. The shutter unit 61 is provided so as to be capable of blocking a light path between the imaging optical system 26 and the solid-state imaging element 20, and can take an open state and a closed state. The shutter unit 61 is in an open state while a live view image and a video are taken, and is temporarily in a closed state while a static image is taken. The shutter unit 61 is driven by a shutter motor 71. The motor driver 62 controls the driving of the shutter motor 71.

The driving of the solid-state imaging element 20 is controlled by the body control unit 60. For example, the solid-state imaging element 20 is a single-plate color imaging CMOS (Complementary Metal Oxide Semiconductor) image sensor including an R (Red) G (Green) B (Blue) color filter. The solid-state imaging element 20 includes a light-receiving surface that is formed of a plurality of pixels (not shown) arranged in the form of a two-dimensional matrix. Each of the pixels includes a photoelectric conversion element, and generates an imaging signal by photoelectrically converting the image of a subject that is formed on the light-receiving surface by the lens barrel 12.

Further, the solid-state imaging element 20 includes a noise rejection circuit, an automatic gain controller, and a signal processing circuit, such as an A/D (Analog to Digital) conversion circuit, (all of them are not shown). The noise rejection circuit performs noise rejection processing on an imaging signal. The automatic gain controller amplifies the level of an imaging signal to an optimum value. The A/D conversion circuit converts an analog imaging signal into a digital signal and outputs the digital signal to the busline 68 from the solid-state imaging element 20. An output signal of the solid-state imaging element 20 is image data (so-called RAW data) that has one color signal for each pixel.

The image memory 63 stores image data corresponding to one frame that is output from the solid-state imaging element 20. The image data processing unit 64 reads the image data, which corresponds to one frame, from the image memory 63, and performs publicly known image processing, such as a matrix operation, demosaicing, γ-correction, brightness/color difference conversion, and resize processing.

The LCD driver 66 sequentially inputs the image data, which corresponds to one frame and has been subjected to image processing by the image data processing unit 64, to the image display unit 21 or the EVF panel 24. The image display unit 21 and the EVF panel 24 sequentially display a live view image at a predetermined period. The card I/F 67 is built in a card slot (not shown) provided in the camera body 11, and is electrically connected to a memory card 69 inserted into the card slot. The card I/F 67 stores the image data, which has been subjected to image processing by the image data processing unit 64, in the memory card 69. Further, in a case in which the image data stored in the memory card 69 is to be displayed, the card I/F 67 reads the image data from the memory card 69.

The body control unit 60 performs control for moving the focus lens 55 on the lens control unit 51 on the basis of the output of the first sensor 29 or the output of the second sensor 30. The body control unit 60 corresponds to a "control unit" of the invention. The body control unit 60 sends a control signal, which allows a first manual focus mode and a second manual focus mode to be selectively executed, to the lens control unit 51. In the case of the first manual focus mode, the body control unit 60 moves the focus lens 55 according to the rotational direction and the rotation angle of the first operation ring 27 that are detected by the first sensor 29. In the case of the second manual focus mode, the body control unit 60 moves the focus lens 55 according to the angular position of the second operation ring 28 that is detected by the second sensor 30. The lens control unit 51 controls the motor driver 52 on the basis of a control signal and moves the focus lens 55.

In the case of the first manual focus mode, the body control unit 60 obtains a rotational speed on the basis of a rotation angle, which is detected per predetermined time by the first sensor 29, and changes the moving distance of the focus lens 55 according to the rotational speed. That is, the body control unit 60 performs control for reducing the moving distance of the focus lens 55 in a case in which the rotational speed is low, and performs control for increasing the moving distance of the focus lens 55 in a case in which the rotational speed is high.

In the case of the second manual focus mode, the body control unit 60 moves the focus lens 55 to a position, at which an imaging distance corresponding to the distance scale 38 of a position indicated by the index 39 is obtained, on the basis of the detection signal of the second sensor 30.

Further, the body control unit 60 inhibits the execution of the second manual focus mode while the first sensor 29 detects the rotation of the first operation ring 27. Furthermore, the body control unit 60 inhibits the execution of the first manual focus mode while the angular position detected by the second sensor 30 is changed.

In addition, the body control unit 60 executes an auto-focus mode on the basis of the angular position of the second operation ring 28, which is detected by the second sensor 30, in a case in which the index 39 is positioned at the position representing the mark 40.

The AF processing unit 65 calculates an AF evaluation value, which is an integrated value of high-frequency components, from the image data corresponding to one frame. The AF evaluation value corresponds to the contrast of an image. The body control unit 60 calculates the position of the focus lens 55, at which the AF evaluation value is the largest value, (focus position) on the basis of the AF evaluation value, which is calculated for each image corresponding to one frame, in the case of the auto-focus mode; and sends a control signal to the lens control unit 51. The lens control unit 51 controls the motor driver 52 on the basis of the control signal received from the body control unit 60, and moves the focus lens 55 to the focus position.

Further, the body control unit 60 operates the diaphragm unit 56 according to the output of a sensor that detects the rotation of the diaphragm adjusting ring 32 and sends a control signal, which allows a diaphragm diameter to change, to the lens control unit 51. The lens control unit 51 controls the motor driver 52 on the basis of the control signal received from the body control unit 60, and changes the diaphragm diameter.

The auto-focus mode and the manual focus mode can be selected and input in the camera body 11 by the operation of a mode switching lever 72 (see FIG. 2) provided on the front surface of the camera body 11. However, in a case in which the lens barrel 12 is connected to the camera body 11, the body control unit 60 gives priority to the first and second manual focus modes or the auto-focus mode that is executed on the basis of the outputs of the first and second operation rings 27 and 28. That is, in a case in which the lens barrel 12 is connected to the camera body 11, the selection of the auto-focus mode and the manual focus mode becomes unavailable.

In the case of the first manual focus mode or the second manual focus mode, the body control unit 60 controls the LCD driver 66 to allow the image display unit 21 to display a distance scale and an index, which represent the imaging distance of the imaging optical system 26, on the basis of the detection signal of the first sensor 29 or the second sensor 30.

Figure 9A:
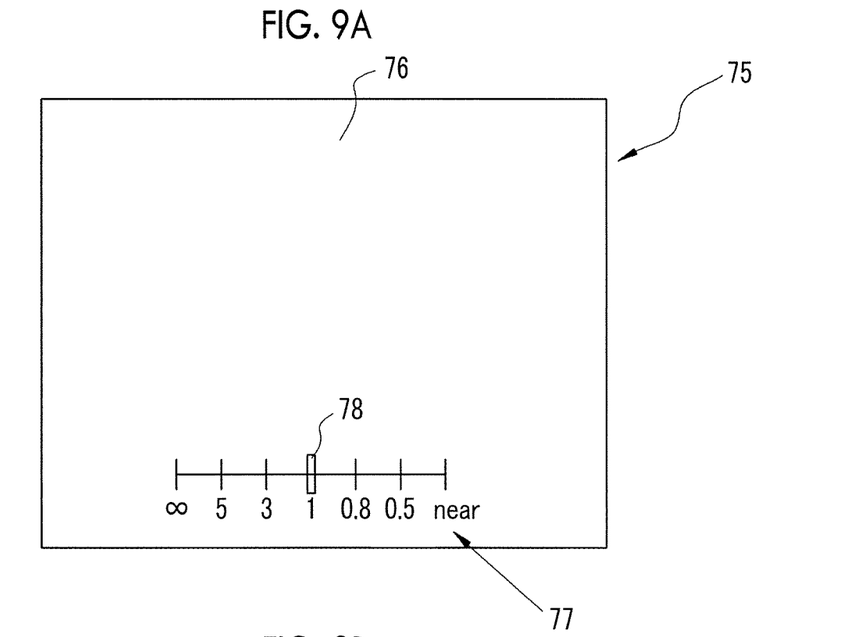
FIG. 9A is a view showing a display screen in which a distance scale and an index are displayed.

FIG. 9A shows a display screen in which a distance scale 77 and an index 78 representing the imaging distance of the imaging optical system 26 are displayed in the image display unit 21. FIG. 9A is a view showing a display screen in which a distance scale and an index are displayed. In this display screen 75, the distance scale 77 and the index 78 are displayed below an image display area 76. The same numerals and symbols as those of the distance scale 38 of the lens barrel 12 are arranged on the distance scale 77. In the case of the first manual focus mode, the index 78 moves on the distance scale 77 according to the rotational direction and the rotation angle of the first operation ring 27 and indicates the position of the current imaging distance. In the case of the second manual focus mode, the index 78 moves on the distance scale 77 according to the angular position of the second operation ring 28 and indicates the position of the current imaging distance.

The image display unit 21 functions as a notification unit in the case of the first manual focus mode. In the second manual focus mode, the focus lens 55 can be positioned at a position corresponding to the distance scale 38 of the position indicated by the index 39. However, in the case of the first manual focus mode, the focus lens 55 may be positioned at a position deviating from the position corresponding to the distance scale 38 in the event that the focus lens 55 is moved according to the rotational direction and the rotation angle of the first operation ring 27.

In the first manual focus mode, the body control unit 60 compares the position, which corresponds to the distance scale 38 of the position indicated by the index 39 and is based on the detection signal of the second sensor 30, with the position of the focus lens 55, which has been moved according to the rotational direction and the rotation angle of the first operation ring 27, the position being based on the detection signal of the first sensor 29. Then, the body control unit 60 sends a notification signal to the LCD driver 66 in a case in which a difference equal to or larger than a certain level is generated between the position of the focus lens 55 and the position corresponding to the distance scale 38.

Figure 9B:
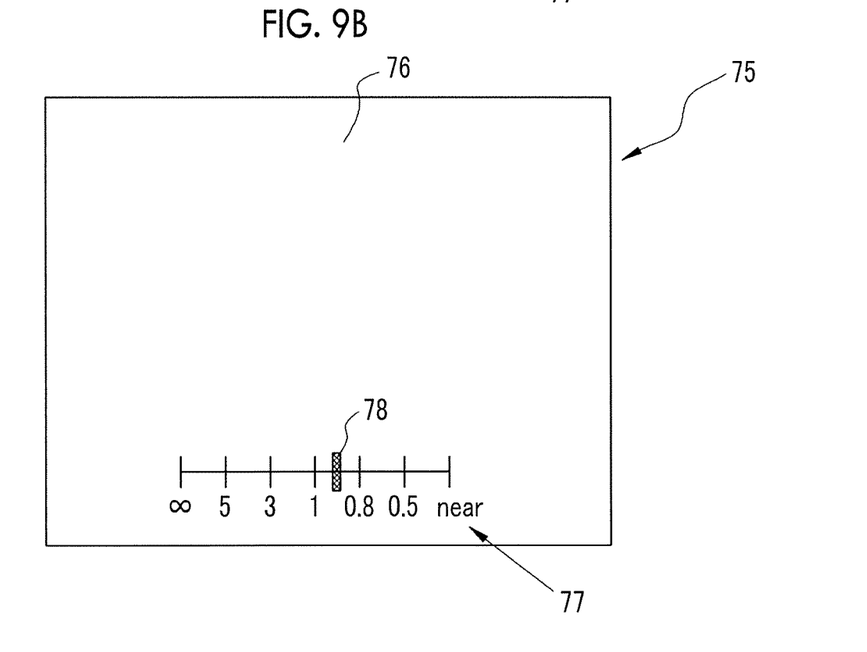
FIG. 9B is a view showing a display screen in a case in which notification is performed.

In the event that the notification signal is input to the LCD driver 66 from the body control unit 60, the LCD driver 66 changes the display screen 75 of the image display unit 21. For example, as shown in FIG. 9B, the LCD driver 66 changes the color of the index 78 in a case in which a difference equal to or larger than a certain level is generated between the position of the focus lens 55 and the position corresponding to the distance scale 38. The image display unit 21 can notify a user of the generation of the difference by changing displayed contents in this way.

Figure 10:
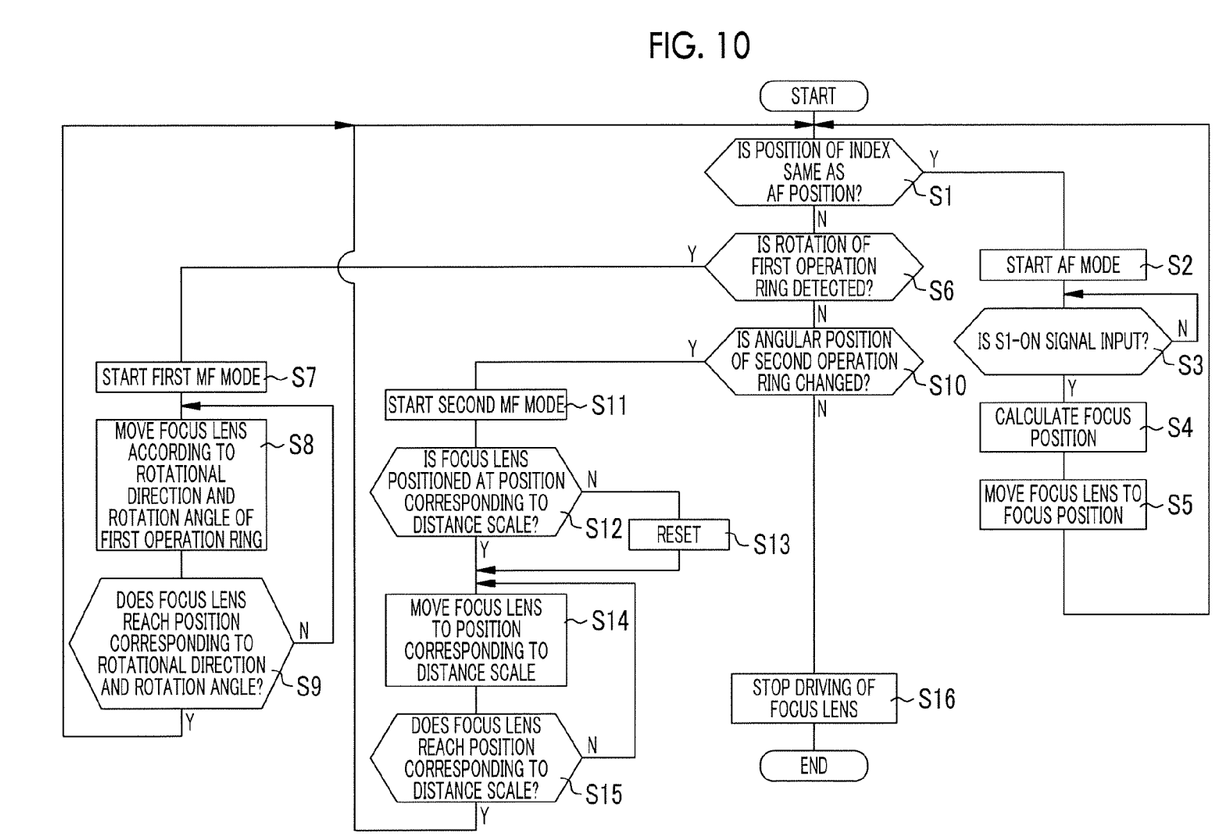
FIG. 10 is a flow chart showing an imaging procedure of the lens-interchangeable digital camera.

The operation of the camera 10 will be described below with reference to a flow chart of FIG. 10. First, in the event that the power lever 13 is operated by a user and a power supply is turned on, a voltage is supplied to the respective parts of the camera 10. In the event that the operation buttons 22 and the like are operated and an imaging mode is selected, the body control unit 60 detects the angular position of the second operation ring 28 from the detection signal of the second sensor 30 and determines whether or not the position of the index 39 is the same as the position of the mark 40 representing an auto-focus position (S1).

Assuming that the position of the index 39 is the same as the position of the mark 40 (YES in S1), the body control unit 60 instructs the AF processing unit 65 and the like to start an auto-focus mode (S2). Assuming that an S1-ON signal is input to the body control unit 60 by the half press of the release switch 14 (YES in S3), the body control unit 60 calculates a focus position on the basis of an AF evaluation value calculated by the AF processing unit 65 (S4) and moves the focus lens 55 to the calculated focus position (S5).

On the other hand, assuming that the position of the index 39 is not the same as the position of the mark 40 (NO in S1), the body control unit 60 determines whether or not the first operation ring 27 has rotated on the basis of the detection signal of the first sensor 29 (S6). Assuming that the rotation of the first operation ring 27 is detected (YES in S6), the body control unit 60 starts the first manual focus mode (S7) and moves the focus lens 55 according to the rotational direction and the rotation angle of the first operation ring 27 (S8). Since the position of the focus lens 55 is set to the position corresponding to the distance scale 38 in a case in which the second manual focus mode is executed before the start of the first manual focus mode, the focus lens 55 deviates from the position corresponding to the distance scale 38 according to the rotational direction and the rotation angle of the first operation ring 27 in Step 8 (S8).

In the first manual focus mode, as described above, the body control unit 60 obtains a rotational speed on the basis of a rotation angle, which is detected per predetermined time by the first sensor 29, and changes the moving distance of the focus lens 55 according to the rotational speed; and changes the display of the image display unit 21 by the LCD driver 66 in a case in which a difference equal to or larger than a certain level is generated between the position of the focus lens 55 and the position corresponding to the distance scale 38. Further, while the first sensor 29 detects rotation and the first manual focus mode is executed, the body control unit 60 inhibits the execution of the second manual focus mode. Accordingly, a mode is not switched to the second manual focus mode even though the angular position of the second operation ring 28 is changed during this time.

Assuming that the focus lens 55 does not reach the position corresponding to the rotational direction and the rotation angle of the first operation ring 27 (NO in S9), the movement of the focus lens 55 is continued (S8). Assuming that the focus lens 55 reaches the position corresponding to the rotational direction and the rotation angle of the first operation ring 27 (YES in S9), a flow returns to the determination of Step 1 (S1).

Assuming that the position of the index 39 is not the same as the position of the mark 40 (NO in S1) and the rotation of the first operation ring 27 is not detected (NO in S6), the body control unit 60 determines whether or not the angular position of the second operation ring 28 is changed on the basis of the detection signal of the second sensor 30 (S10). Assuming that the angular position of the second operation ring 28 is changed (YES in S10), the body control unit 60 starts the second manual focus mode (S11) and, first of all, determines whether or not the focus lens 55 is positioned at the position corresponding to the distance scale 38 of the second operation ring 28 (S12).

Assuming that the focus lens 55 is not positioned at the position corresponding to the distance scale 38 (NO in S12), the body control unit 60 performs reset control for setting the position of the focus lens 55 to the position corresponding to the distance scale 38 (S13). Since the position of the focus lens 55 and the position corresponding to the distance scale 38 are different from each other in a case in which the first manual focus mode is executed before the start of the second manual focus mode, the body control unit 60 performs this reset control.

Further, in a case in which the auto-focus mode is executed before the second manual focus mode, the position of the focus lens 55 varies according to a distance to a subject and is set to, for example, a position where an imaging distance of about 3 m at which there are many chances to take an image is obtained. For this reason, in a case in which the second manual focus mode is started, the body control unit 60 performs reset control for temporarily setting the focus lens 55 to a position corresponding to infinity that is indicated by the distance scale 38 positioned next to the mark 40.

After the reset control, the body control unit 60 moves the focus lens 55 on the basis of the detection signal of the second sensor 30 (S14). Further, even assuming that the focus lens 55 is positioned at the position corresponding to the distance scale 38 (YES in S12), the body control unit 60 moves the focus lens 55 on the basis of the detection signal of the second sensor 30 (S14). Since the body control unit 60 inhibits the execution of the first manual focus mode while the angular position of the second operation ring 28 detected by the second sensor 30 is changed and the second manual focus mode is performed, a mode is not switched to the first manual focus mode even though the first sensor 29 detects rotation during this time.

Assuming that the focus lens 55 does not reach the position corresponding to the distance scale 38 (NO in S15), the movement of the focus lens 55 is continued (S14). Assuming that the focus lens 55 reaches the position corresponding to the distance scale 38 (YES in S15), a flow returns to the determination of Step 1 (S1). Then, assuming that the position of the index 39 is not the same as the position of the mark 40 (NO in S1), the rotation of the first operation ring 27 is not detected (NO in S6), and the angular position of the second operation ring 28 is not changed (NO in S10), the body control unit 60 stops the driving of the focus lens 55 (S16).

Since the first manual focus mode and the second manual focus mode are selectively executed by only the rotation operation of the first and second operation rings 27 and 28 as described above, a troublesome switching operation is not required. For this reason, it is possible to perform imaging without missing an imaging timing.

Further, since the body control unit 60 inhibits the execution of the second manual focus mode during the execution of the first manual focus mode and inhibits the execution of the first manual focus mode during the execution of the second manual focus mode, the first manual focus mode and the second manual focus mode are not switched at a timing that is not intended by a user.

Furthermore, since a user is notified of the generation of the difference by a change in the displayed contents of the image display unit 21 in a case in which a difference equal to or larger than a certain level is generated between the position of the focus lens 55 and the position corresponding to the distance scale 38 in the first manual focus mode, the user can easily recognize the current imaging distance.

A contrast AF system, which searches for a high-contrast position and brings the high-contrast position into focus while moving the focus lens 55 on the basis of the image signal of the solid-state imaging element 20, has been used in the camera 10 of the embodiment. However, the invention is not limited thereto and a phase difference AF system may be used. A solid-state imaging element in which a plurality of phase difference detection pixels, which have a dependency on the angle of light to be incident on a light-receiving surface, are arranged on the light-receiving surface in a predetermined pattern is used in the phase difference AF system. The phase difference detection pixels are formed of first parallax pixels in which sensitivity to an incident ray from the right is high and second parallax pixels in which sensitivity to an incident ray from the left is high. A focus position is obtained from a shift length between an image that is formed by the plurality of first parallax pixels and an image that is formed by the plurality of second parallax pixels.

In the embodiment, the second operation ring 28 has been provided with the distance scale 38 and the lens barrel body 25 has been provided with the index 39. However, the invention is not limited thereto, and the second operation ring 28 may be provided with an index 39 and the lens barrel body 25 is provided with the distance scale 38. In this case, it is preferable that a mark 40 representing an auto-focus position is provided outside the distance scale 38 of the lens barrel body 25.

Further, in the embodiment, a user has been notified by a change in the color of the index 78 displayed in the image display unit 21 in a case in which a difference equal to or larger than a certain level is generated between the position of the focus lens 55 and the position corresponding to the distance scale 38 in the first manual focus mode. However, the invention is not limited thereto and the color of a portion other than the index may be changed or displayed contents may be changed. Furthermore, the notification unit is not limited to the image display unit 21, and, for example, an indicator of which the light-emitting state or the color changes, or the like may be used as the notification unit. Moreover, the manual zoom mechanism for moving the variable magnification lens 54 has been provided in the embodiment. However, the invention is not limited thereto and a zoom mechanism, which moves the variable magnification lens 54 by driving a motor according to the output of a sensor detecting the rotation of the zoom ring 31, may be provided.

The mirrorless single-lens digital camera has been described in the embodiment byway of example, but the invention can also be applied to other lens-interchangeable digital cameras, such as a single lens reflex digital camera. Further, the camera body and the lens barrel have been formed of separate bodies and have been adapted to be detachably connected to each other in the digital camera of the embodiment. However, the invention is not limited thereto, and an imaging device in which a camera body and a lens barrel are provided integrally with each other may be provided.

EXPLANATION OF REFERENCES

10: lens-interchangeable digital camera
11: camera body
12: lens barrel
20: solid-state imaging element
25: lens barrel body
26: imaging optical system
27: first operation ring
28: second operation ring
29: first sensor
30: second sensor
38: distance scale
39: index
40: mark
60: body control unit

What is claimed is:

1. A camera body to which a lens barrel is detachably connected;
(A) the lens barrel including:
a lens barrel body that houses an imaging optical system including a focus lens;
a first operation ring that is mounted on the lens barrel body so as to be endlessly rotatable about an optical axis of the imaging optical system;
a second operation ring that is mounted on the lens barrel body so as to be rotatable about the optical axis in a limited angular range;
a first sensor that detects a rotation of the first operation ring and a rotational direction and a rotation angle of the first operation ring;
a second sensor that detects an angular position of the second operation ring; and
a drive unit that moves the focus lens in a direction of the optical axis;
wherein one of the lens barrel body and the second operation ring is provided with a distance scale and the other thereof is provided with an index,
the drive unit moves the focus lens to a position, which corresponds to the distance scale set to a position of the index, on the basis of an output of the second sensor;
(B) the camera body comprising:
a control unit that controls the drive unit and allows a first manual focus mode in which the focus lens is moved according to the rotational direction and the rotation angle detected by the first sensor and a second manual focus mode in which the focus lens is moved according to the angular position detected by the second sensor to be selectively executed;
an imaging unit that takes an image with light emitted from the lens barrel body; and
a notification unit that notifies the generation of a difference equal to or larger than a certain level between the position of the focus lens and a position corresponding to the distance scale in a case in which the difference equal to or larger than a certain level is generated between the position of the focus lens and the position corresponding to the distance scale in the first manual focus mode.

2. The camera body according to claim 1,
wherein the first sensor includes a comb-tooth ring that is provided on an inner peripheral surface of the first operation ring and an optical sensor that detects teeth of the comb-tooth ring.

3. The camera body according to claim 1,
wherein the second sensor includes a cam member that converts a rotational motion into a linear movement while being linked with the second operation ring, and a variable resistor of which a resistance value is changed by the linear movement of the cam member.

4. The camera body according to claim 1,
wherein in the case of the first manual focus mode, the control unit obtains a rotational speed on the basis of the rotation angle, which is detected per predetermined time by the first sensor, and changes a moving distance of the focus lens according to the rotational speed.

5. The camera body according to claim 1,
wherein the control unit inhibits the execution of the second manual focus mode while the first sensor detects the rotation.

6. The camera body according to claim 1,
wherein the control unit inhibits the execution of the first manual focus mode while the angular position detected by the second sensor is changed.

7. The camera body according to claim 1,
wherein the notification unit is an image display unit displaying an image, and displays that the difference is generated.

* * * * *